UNITED STATES PATENT OFFICE.

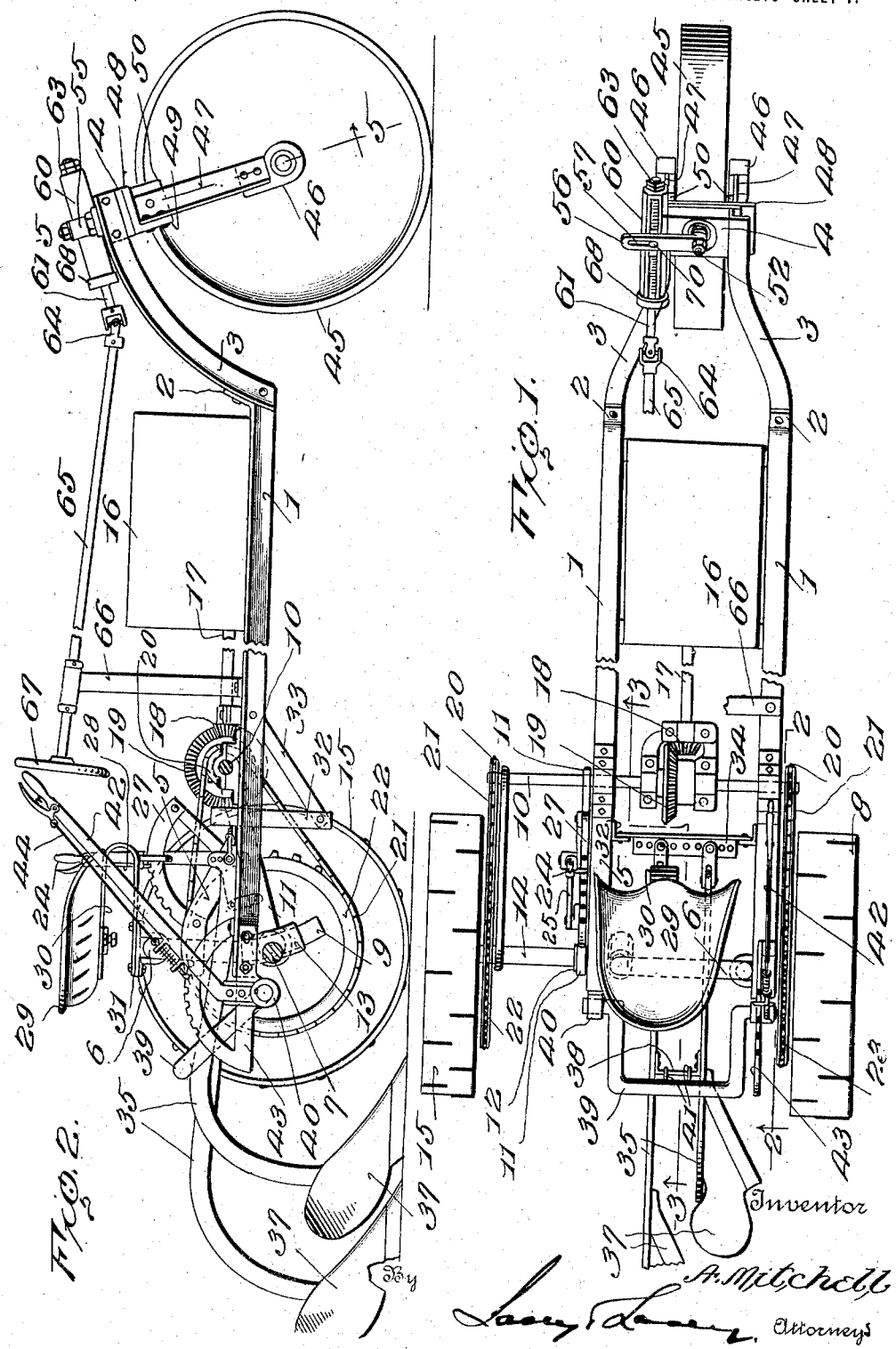

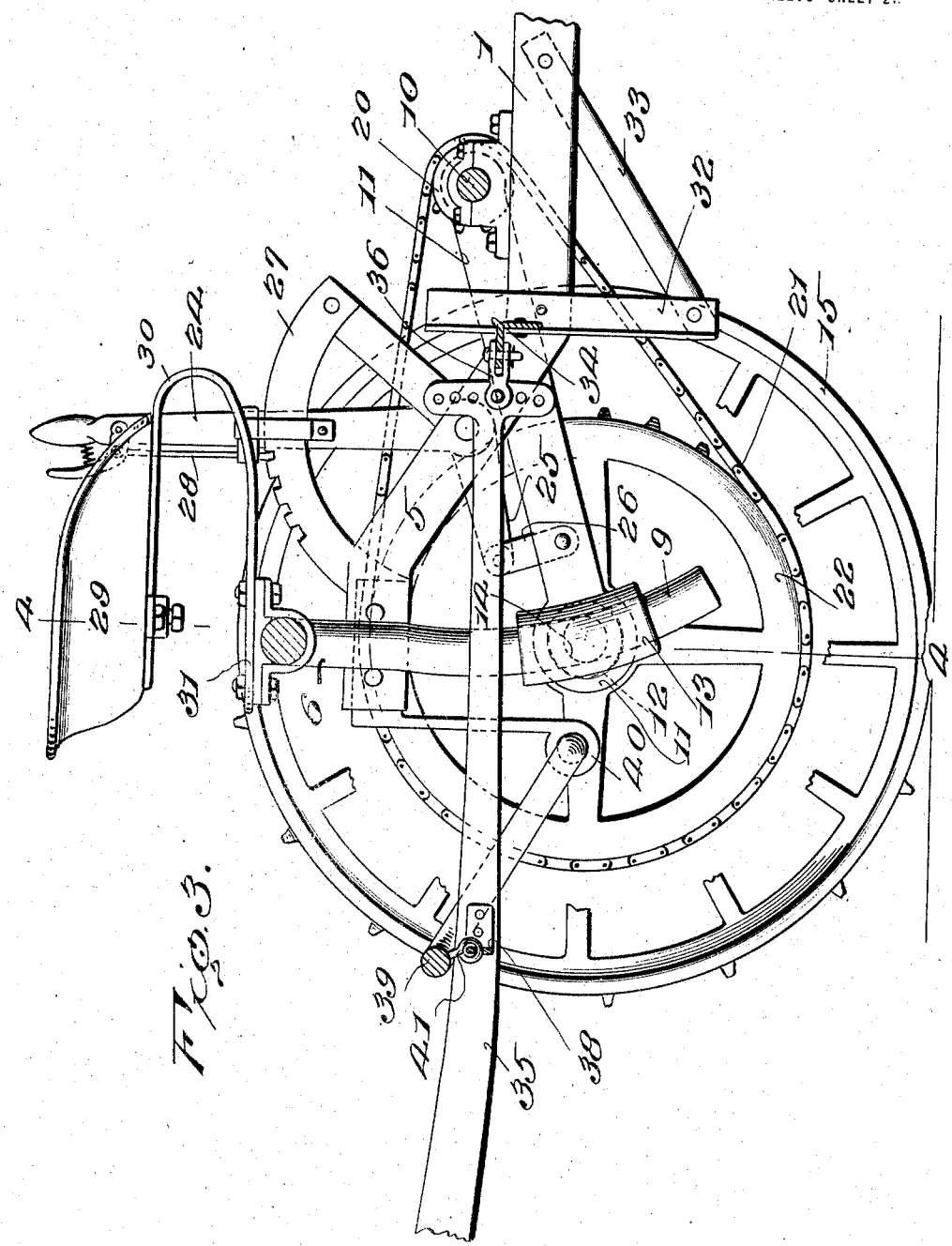

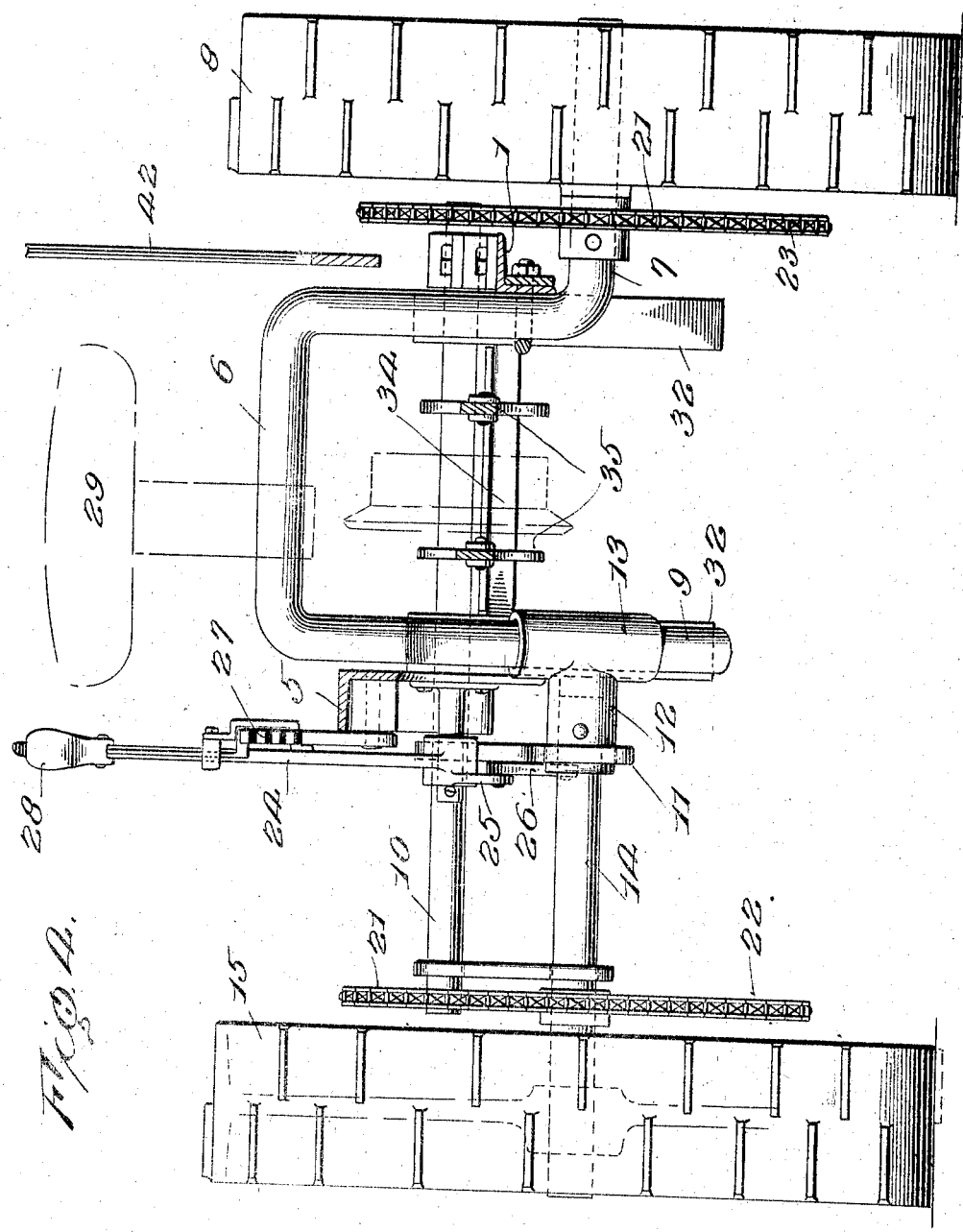

ALEXANDER MITCHELL, OF PUEBLO, COLORADO.

PLOW.

1,307,918.   Specification of Letters Patent.   Patented June 24, 1919.

Application filed July 8, 1918. Serial No. 243,834.

*To all whom it may concern:*

Be it known that I, ALEXANDER MITCHELL, a citizen of the United States, residing at Pueblo, in the county of Pueblo and State of Colorado, have invented certain new and useful Improvements in Plows, of which the following is a specification.

This invention has for its object the provision of a motor-propelled plow which will be compact in the arrangement of its parts and may be readily adjusted so that the frame will remain level while one wheel runs in a previously formed furrow and the wheel at the opposite side runs on the unplowed land.

The invention is illustrated in the accompanying drawings and consists in certain novel features which will be particularly pointed out in the claims following the detailed description.

In the drawings:

Figure 1 is a plan view of a plow embodying my improvements;

Fig. 2 is a view partly in side elevation and partly in longitudinal section on the line 2—2 of Fig. 1;

Fig. 3 is a longitudinal section on the line 3—3 of Fig. 1;

Fig. 4 is a transverse section on the line 4—4 of Fig. 3;

In carrying out my invention, I employ a frame comprising parallel side bars 1 of angle-iron having slits formed in their front ends whereby their flanges may be separated, the upper horizontal flange having its front extremity turned upwardly, as shown at 2. To the front extremities of the side bars 1, I secure the upwardly extending and forwardly converging frame members 3 which are also preferably constructed of angle-iron and have their front ends secured to the opposite sides of a bearing block or head 4. The rear end of one side bar is carried upwardly, as shown at 5, and to the rear ends of the side members, I secure the arched axle 6 having a spindle 7 extending from one side to carry the furrow wheel 8. The side member of the arched axle 6, more remote from the furrow wheel, is curved, as shown at 9, concentric with the transmission shaft 10 which is mounted in suitable bearings upon the frame of the machine. A radius bar 11 is loosely mounted upon the shaft 10 and has its rear end fitted around the lateral member 12 of a T-shaped socket 13, the said member 12 supporting the inner end of a spindle 14 upon the outer end of which the land wheel 15 is mounted. A motor, indicated conventionally at 16, is supported upon the main frame and the driving shaft of said motor, indicated at 17, is equipped at its rear end with a beveled pinion 18 meshing with a beveled gear 19 on the transmission shaft 10. Sprocket pinions 20 are secured upon the ends of the transmission shaft and chains 21 are trained around the said pinions and sprocket wheels 22 and 23 which are connected rigidly with the hubs of the land wheel 15 and the furrow wheel 8, respectively. It will thus be readily seen that when the motor is operating, the power of the same will be transmitted through the described gearing and the shaft 10 to the sprocket wheels 22 and 23 and thence to the land wheel and furrow wheel so that the machine will be driven forward over the field.

A hand lever 24 is fulcrumed upon the side of the main frame at a point above the radius bar 11 and is provided at its lower end with a crank 25 from the rear end of which a link 26 extends to connect the crank with the said radius bar. A rack 27 is fixed upon the frame concentric with the fulcrum of said hand lever and a latch 28 is mounted upon the said lever in position to engage the said rack and thereby hold the lever in any position in which it may be set. It will be readily understood that by shifting the lever forwardly or backwardly the socket member 13 will be raised or lowered and, consequently, the spindle 14 will be set at a higher or lower point and the land wheel 15 adjusted vertically so as to permit the furrow wheel to ride in a previously formed furrow and the main frame to remain level transversely. The driver's seat 29 is carried by a spring 30 which is secured upon the arched axle 6 through clamps 31, of any preferred or convenient construction, and is so disposed that the lever 24 may be easily reached therefrom.

Hangers 32 are secured to the side bars 1 in rear of the transmission shaft 10 and the lower ends of said hangers are connected with the side bars by braces 33, as clearly shown, so that the necessary rigidity will be attained. A draft bar 34 is secured to and extends horizontally between the hangers 32, and the front ends of plow beams 35 are connected to the said draft bar by clevises 36 or other preferred coupling means, as will be readily understood. Plows 37 are carried by the rear ends of the beams 35 and I preferably employ two plows, the beams being connected at any convenient point of their length by a transverse yoke or brace 38. To set the plows so as to run at any desired depth, I provide a yoke or crank 39, the ends of which are journaled in bearings 40 provided therefor at the rear ends of the side bars, and the intermediate portion of this yoke or crank is connected with the brace 38 by chains or links 41, as shown and as will be readily understood. A hand lever 42 is secured to one end of the crank 39 so that movement of the lever will cause the crank to rock about its bearings and a rack 43 is secured to the rear end of the adjacent side bar 1 and disposed concentric with the said bearing to be engaged by a latch 44 on the lever 42 whereby the lever will be held in a set position. It will be readily understood that movement of the lever forwardly or rearwardly will cause the crank 39 to oscillate about its bearings and thereby raise or lower the plows so that they may be raised entirely clear of the ground or set to form a furrow of any desired depth.

The front end of the frame is supported by a steering wheel 45 having its axle journaled in bearings 46 secured to the lower ends of standards 47, the upper ends of which are connected with the ends of a steering head or fifth wheel 48. The standards 47 are disposed with their upper ends between a lug 49 at the rear of the head 48 and a bracket 50 to which they are secured, the said bracket being secured to the underside of the head 48 and engaging the lower end of a king bolt 52. The king bolt 52 extends up through the head block 4 so as to rotate therein, suitable means being provided to hold the parts in their proper assembled relation. The king bolt is provided with an angular upper portion to be engaged by the socket 55 of a steering arm 56 extending laterally therefrom and equipped at its outer end with a longitudinal slot 57, as shown. Upon the upper extremity of the frame member 3 I rigidly secure a sleeve 60 within which is longitudinally disposed a worm or screw 61, said screw or worm being held against longitudinal movement relative to the sleeve. The rear end of this screw or worm is connected by a universal joint 64 with the steering rod 65 mounted in a support 66 on the main frame and equipped at its rear end with a steering wheel 67 within easy reach of the operator upon the seat 29. The rear end of the sleeve 60 is closed by a cap 68 and within the sleeve, upon the worm or screw 61, I fit a nut from which a pin or stud 70 projects through a longitudinal slot in the upper side of the sleeve whereby the nut will be prevented from turning with the worm or screw but will be permitted to travel longitudinally thereof. The said pin or stud 70 engages the longitudinal slot 57 in the steering arm 56 and, consequently, the travel of the nut 69 will swing the said steering arm or lever with the king bolt as a center and will, therefore, rotate the king bolt about its own axis so that the yoke consisting of the steering head or plate 48 and the standards 47 will be moved into an angular position relative to the main frame and the steering wheel thereby directed to one side so that the machine may be caused to follow a prescribed path.

It is thought the advantages of my improved plow will be readily understood from the foregoing description, taken in connection with the accompanying drawings. The machine carries its own power and may be easily controlled by a single operator seated upon the main frame. The parts are very compactly arranged so that the land wheel may be easily set at a proper height to compensate for the depth of the furrows and the plows just as easily and quickly raised from the ground to permit turning of the machine or lowered to cut into the soil to any desired depth. The construction is such that the number of parts is minimized while at the same time the rigidity of the frame and the strength of the same is maintained.

Having thus described my invention, what is claimed as new is:

1. The combination of a main frame, an arched axle secured upon the main frame and having a spindle at one side to carry a wheel, the opposite side of the arched axle being arcuate, a socket member slidably mounted upon the arcuate portion of the arched axle, a wheel carried by said socket member, and means for shifting said socket member whereby the wheel carried thereby may be set at various heights.

2. The combination of a main frame, a shaft mounted transversely upon the frame, means for rotating said shaft, an arched axle secured to the rear end of the main frame and provided at one side with a spindle, the opposite side of the said arched axle being curved concentric with the said shaft, a wheel mounted upon the said spindle, gearing connecting said wheel with the said shaft, a socket member slidably mounted upon the arcuate member of the arched axle, a spindle carried by said socket member, a wheel mounted on said spindle, gearing connecting said wheel with the said shaft, and means on the main frame for shifting the socket member upon the arcuate portion of the arched axle.

3. The combination of a main frame, a shaft mounted transversely thereon, means for rotating said shaft, a radius rod fitted loosely at its front end on said shaft, an arched axle secured to the rear ends of the main frame and provided at one side with a spindle, a wheel mounted on said spindle, the arched axle at the side remote from the wheel being arcuate concentric with the said transverse shaft, a socket member slidably mounted upon the arcuate portion of the axle and engaged by the rear end of the radius rod, a spindle carried by said socket member, a wheel mounted on said spindle, operative connections between the transverse shaft and the first-mentioned wheel and between the transverse shaft and the second-mentioned wheel, and means acting on the radius rod to shift the socket member upon the arcuate portion of the arched axle.

4. The combination of a main frame comprising parallel side bars, the rear end of one of said side bars being turned upwardly, an arched axle secured to the rear ends of the side bars and having its side below the said upturned end of the adjacent side bar arcuate and provided with a spindle at its opposite side, a wheel mounted on said spindle, a socket member slidably mounted on the arcuate member of the arched axle, a spindle carried by said socket member, a wheel mounted on said spindle, a shaft on the main frame concentric with the arcuate portion of the arched axle, means for rotating said shaft, operative connections between said shaft and the said wheels respectively, a radius rod having its front end loosely fitted on the said shaft and its rear end engaging the socket member, a hand lever mounted upon the main frame, a crank at the lower end of said lever, a link connecting the said crank with the radius rod, and means for holding said lever in a set position.

In testimony whereof I affix my signature.

ALEXANDER MITCHELL. [L. S.]

Copies of this patent may be obtained for five cents each, by addressing the "Commissioner of Patents, Washington, D. C."